Patented Nov. 16, 1948

2,453,691

UNITED STATES PATENT OFFICE 2,453,691

METHOD OF MAKING ETHYL CHLORIDE

Howard W. Hill, Concord, and Eldred L. Dance, Berkeley, Calif., assignors to The Dow Chemical Company, Midland, Mich., a corporation of Delaware No Drawing. Application May 17, 1944, Serial No. 536,032

4 Claims. (Cl. 204—163)

This invention relates to methods of making ethyl chloride, and has particular regard to improvements in making ethyl chloride as the principal product of the chlorination of ethane.

In the chlorination of ethane by the action of gaseous chlorine the art has employed various procedures. One well known procedure consists in exposing a mixture of ethane and chlorine to a source of actinic light which induces and promotes the reaction. Such photochemical method is ordinarily carried out at moderately elevated temperatures, on the order of about 100° to 300° C., cooling being employed to absorb a sufficient proportion of the heat of reaction that an excessive temperature rise in the gaseous reaction mixture is prevented. The successive stages of substitution of chlorine in a hydrocarbon molecule are known to overlap extensively, so that it is not practically possible by direct chlorination of ethane to produce a single partial chlorination product to the exclusion of others. The usual expedient in chlorinating ethane to obtain ethyl chloride as the principal product is to employ a large excess of ethane, e. g., 6 to 10 or more volumes of ethane per volume of chlorine, so as to minimize the formation of dichlorethanes.

We have found that certain unexpected advantages are attained in the direct photochemical chlorination of ethane to produce ethyl chloride, when mixtures of ethane with methane are employed instead of pure ethane. Our investigations have shown that, for a particular $Cl_2/C_2H_6$ ratio, a higher yield of ethyl chloride is obtained in chlorinating a mixture of ethane and methane within the range hereinafter shown than when pure ethane is chlorinated. This result is of great practical value. The commercial sources of ethane are natural gas and petroleum refinery gases, in which ethane is normally a minor component accompanied by a much larger proportion of methane. The separation of pure ethane from such gases by the usual methods of solvent extraction under pressure, followed by liquefaction of the hydrocarbon extract and fractionation of the same, is a costly procedure. On the other hand the separation of a mixture of ethane and methane in proportions within the range of our invention is simpler and more readily accomplished, so that such mixtures are obtainable at a lower cost for the ethane content of the same than is pure ethane. According to our method the chlorination of such mixtures of ethane and methane produces a high yield of ethyl chloride substantially free from chlorinated methanes, the separation of which from the residual gas is easily effected.

It is known that ethane is more readily chlorinated than is methane, so that in the chlorination of a mixture of methane and ethane the latter is preferentially chlorinated to a greater or less extent. For example, in U. S. Patent No. 1,908,312 is described a method of purifying methane from small amounts of ethane which accompany it by a partial chlorination in which the ethane is preferentially chlorinated and the chlorinated ethanes are separated from the methane. However, the patented process depends upon a catalytic thermal chlorination at temperatures between 200° and 400° C. In the latter process considerably more than an equimolecular proportion of chlorine to ethane is required for complete removal of the ethane, and under the conditions employed the chlorinated ethanes formed consist largely of the dichlor derivatives. The patented procedure is not adapted for the production of ethyl chloride in commercial yield.

According to our invention a mixture of ethane with from approximately one-third to three times its volume of methane is taken, to which chlorine is added in the proportion of from about 0.6 to 1.2 volumes of chlorine relative to the volume of ethane in the mixture. The mixed gases are then exposed to actinic light, as from a mercury vapor lamp, to cause reaction between the chlorine and ethane, the zone of reaction being cooled to prevent a temperature rise much above 200° C. Under the stated conditions ethane is chlorinated largely to ethyl chloride together with a minor proportion of dichlorethanes, without any substantial chlorination of methane. The chlorinated ethane derivatives are separated from the reaction product by the usual procedure of condensation, followed by scrubbing with water or an aqueous alkali to remove acid impurities and finally by fractional distillation of the liquid condensate. The yield of ethyl chloride, as well as the ratio of ethyl chloride to dichlorethanes, is considerably increased over that obtainable by the chlorination of ethane alone, using the same ratio of chlorine to ethane.

While the relative proportions of ethane and methane in the mixed gases to be used in practicing the invention may vary from 3/1 to 1/3, the optimum ratio is about 1/1, and the optimum ratio of chlorine to ethane is likewise about 1/1. The favorable effect of methane in the mixture is not observed if the volumetric $Cl_2/C_2H_6$ ratio is materially lower than 0.6, while if the ratio is higher than 1.2 some chlorination of methane occurs. Cooling of the gaseous reacting mixture is important in order to prevent an excessive temperature rise due to liberation of the heat of reaction. A satisfactory temperature range is between about 100° and 200° C. If the temperature is permitted to rise materially above 200° C. some cracking of the chlorinated ethanes is liable to occur, accompanied by splitting off of hydrogen chloride, which reduces the yield of ethyl chloride, and chlorination of ethylene thereby formed increases the proportion of dichlorethanes in the product.

In order to illustrate the advantages of the invention a series of tests was carired out, showing the results of varying the proportions of methane to ethane, and of chlorine to ethane. In these runs the hydrocarbon gas and chlorine were mixed in the dark, and the mixed gases were passed through a tubular glass reactor coil, submerged in a water bath. A 400-watt mercury lamp was disposed centrally within the coil to illuminate the gas stream traversing the coil. The rate of gas flow was correlated with the length and diameter of the coil to give an avearge residence time of the gases in the coil of from 1 to 1.5 seconds. The heat of reaction heated the water bath to boiling. The reaction gases were cooled to condense the liquefiable products, the liquid condensate was scrubbed with water and aqueous alkali, and fractionally distilled to separate the components.

The results of the various runs are shown in the table.

Table

| | Gas Comp. | | Ratio $Cl_2/C_2H_6$ | Per Cent $C_2H_6$ Conv. | Product, Mol Per Cent | | | Per Cent Yield $C_2H_5Cl/C_2H_6$ |
|---|---|---|---|---|---|---|---|---|
| | Per Cent $C_2H_6$ | Per Cent $CH_4$ | | | $C_2H_5Cl$ | $C_2H_4Cl_2$ | $CH_3Cl$ | |
| 1 | 100 | | 0.51 | 48.2 | 92.3 | 7.7 | | 44.5 |
| 2 | 75 | 25 | 0.50 | 49.6 | 89.3 | 10.7 | | 44.3 |
| 3 | 50 | 50 | 0.51 | 49.5 | 89.5 | 10.5 | | 44.3 |
| 4 | 25 | 75 | 0.51 | 43.7 | 90.0 | 10.0 | | 39.3 |
| 5 | 50 | 50 | 0.69 | 65.2 | 87.0 | 13.0 | | 56.7 |
| 6 | 100 | | 1.03 | 74.5 | 77.4 | 22.6 | | 57.6 |
| 7 | 75 | 25 | 1.03 | 81.8 | 77.9 | 22.1 | | 63.7 |
| 8 | 50 | 50 | 1.03 | 88.9 | 86.9 | 13.1 | | 77.2 |
| 9 | 25 | 75 | 1.00 | 81.0 | 80.4 | 19.6 | | 65.1 |
| 10 | 40 | 60 | 1.33 | 87.4 | 56.5 | 37.8 | 5.7 | 49.4 |
| 11 | 25 | 75 | 1.40 | 94.9 | 54.2 | 41.2 | 4.6 | 51.4 |
| 12 | 100 | | 1.55 | 87.6 | 44.5 | 53.1 | | 38.9 |

It will be observed (runs 1-4) that the effect of dilution of ethane with methane, regardless of proportions, is not significant when the ratio of $Cl_2/C_2H_6$ is 0.5 by volume, and no increase in yield of ethyl chloride is obtained. At a $Cl_2/C_2H_6$ ratio of 0.69 (run 5) the yield of ethyl chloride from a 1/1 mixture of ethane and methane is practically equal to that resulting from chlorination of pure ethane with a $Cl_2/C_2H_6$ ratio of 1.03 (run 6). The greatest gain in yield of ethyl chloride is shown where the $Cl_2/C_2H_6$ ratio is 1.03 (runs 6-9). In these runs dilution of ethane with methane not only resulted in a substantial increase of the percentage of ethane converted to chlorinated compounds, but also of the percentage of ethyl chloride in the chlorinated product. The maximum yield is shown (run 8) where the ratio of $CH_4/C_2H_6$ is 1. The effect of a too high chlorine concentration is shown (runs 10, 11) in the formation of methyl chloride along with the chlorinated ethanes, as well as in the higher proportion of dichlorethanes in the product, and lowered yield of ethyl chloride. The dichlorethanes formed along with ethyl chloride consisted of a mixture of 1,1-dichlorethane, and 1,2-dichlorethane, in which the ratio of the former to the latter was roughly 2/1.

We claim:

1. The method of making ethyl chloride which comprises reacting ethane in exposure to light and in the presence of from 1/3 to 3 times its volume of methane with gaseous chlorine in such proportion that the ratio of $Cl_2/C_2H_6$ is between 0.6 and 1.2, at a temperature between 100° and 200° C., and separating ethyl chloride from the reaction product.

2. The method of making ethyl chloride which comprises adding chlorine to a mixture of ethane and methane in which the ratio of $CH_4/C_2H_6$ is from 3/1 to 1/3, the chlorine being in amount such that the molar ratio of $Cl_2/C_2H_6$ is from 0.6 to 1.2, causing reaction between ethane and chlorine by exposing the gaseous mixture to a source of actinic light, while removing heat from the reacting gases to maintain the temperature thereof between 100° and 200° C., and separating ethyl chloride from the reaction product.

3. The method of making ethyl chloride which comprises adding chlorine to an approximately equimolecular mixture of ethane and methane in such proportion that the ratio of $Cl_2/C_2H_6$ is between 0.6 and 1.2, causing reaction between ethane and chlorine by exposing the gaseous mixture to a source of actinic light at a temperature between 100° and 200° C., and separating ethyl chloride from the reaction product.

4. The method of making ethyl chloride which comprises forming a gaseous mixture of ethane, methane and chlorine in approximately equimolecular proportions, passing the mixture through a zone irradiated by actinic light to cause reaction between ethane and chlorine, while controlling the temperature of the reaction zone between 100° and 200° C. and separating ethyl chloride from the reaction product.

HOWARD W. HILL.
ELDRED L. DANCE.

REFERENCES CITED

The following references are of record in the file of this patent:

UNITED STATES PATENTS

| Number | Name | Date |
|---|---|---|
| 2,200,255 | Bender | May 14, 1940 |
| 2,393,509 | Archibald et al. | Jan. 22, 1946 |

FOREIGN PATENTS

| Number | Country | Date |
|---|---|---|
| 586,582 | France | Jan. 7, 1925 |
| 780 | Great Britain | 1915 |

OTHER REFERENCES

Ellis et. al., Chemical Action of Ultra-Violet Light, 1941; pages 526–27.

Cross, Handbook of Petroleum, Asphalt and Natural Gas, 1928 Revised; page 548.

Hass et al., Industrial and Engineering Chemistry, volume 28; 1936; pages 333–39.

Egloff et al., Chemical Reviews, volume 8, 1931; pages 25–26.